June 25, 1968  W. C. HUBER ET AL  3,389,877
INFLATABLE TETHER
Filed Aug. 11, 1967  2 Sheets-Sheet 1
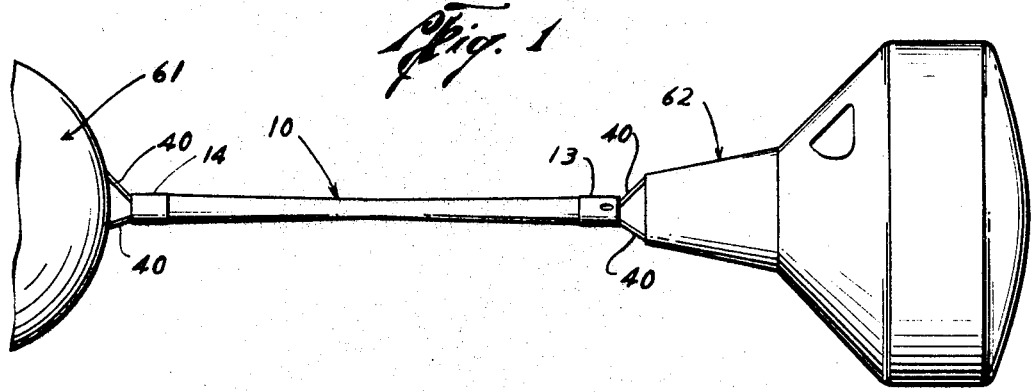
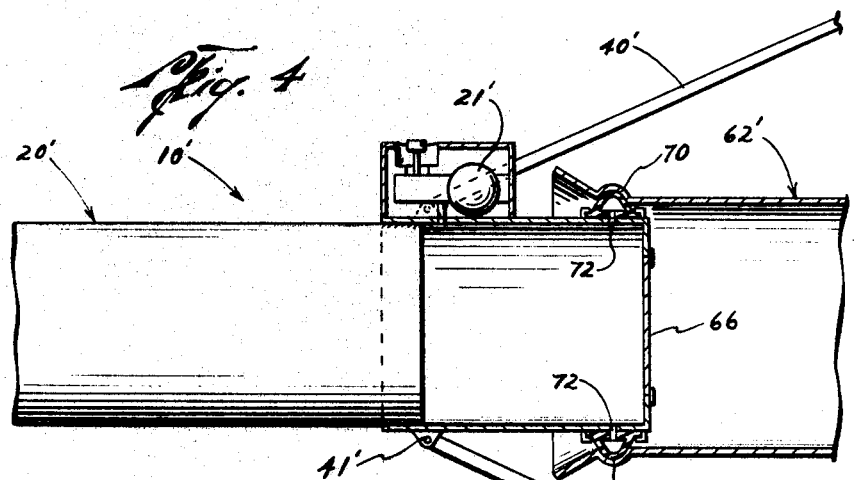
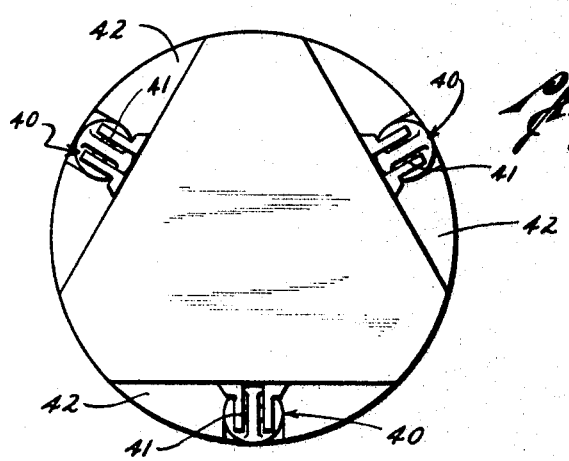
William C. Huber
Edwin Samfield
INVENTORS
BY
ATTORNEYS

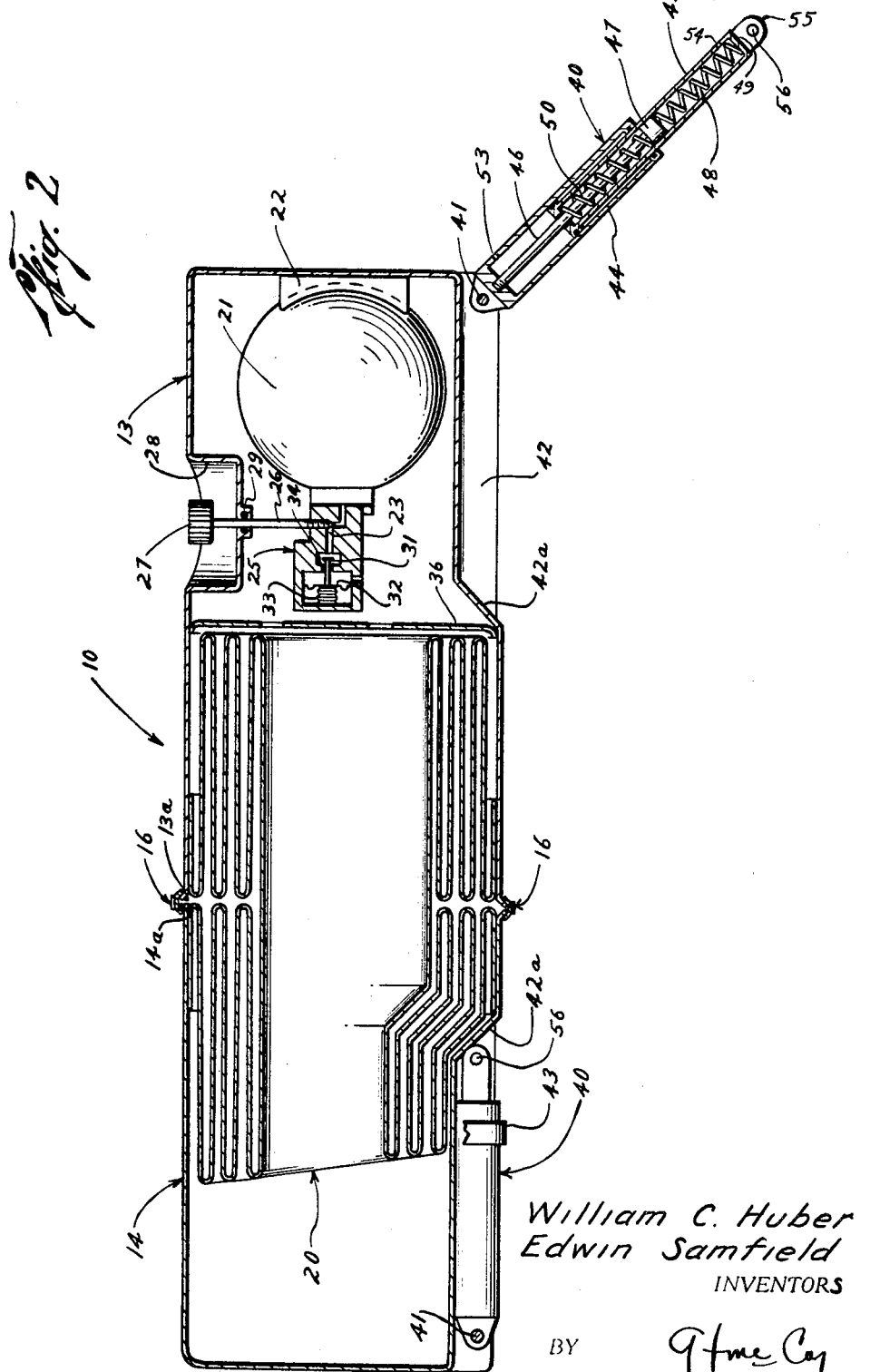

United States Patent Office 3,389,877
Patented June 25, 1968

3,389,877
INFLATABLE TETHER
William C. Huber and Edwin Samfield, Harris County, Tex., assignors to the United States of America as represented by the Administrator of the National Aeronautics and Space Administration
Filed Aug. 11, 1967, Ser. No. 660,573
9 Claims. (Cl. 244—1)

ABSTRACT OF THE DISCLOSURE

An inflatable tether device particularly adapted for tethering objects in zero gravity environment. The device includes an inflatable structure comprising a pair of cup-like rigid housing sections and a tubular casing of flexible fabric bonded at its respective ends to the housing sections to provide a closed inflatable structure. For stowage, the housing sections are connectable in a lip-to-lip configuration by a releasable clamp with the fabric casing folded therein in a readily expandable condition. The structure is inflatable into a semi-rigid column by a compressed gas supply and together with shock absorber struts, which are provided at each end of the inflatable structure, dampens disturbing forces and relative oscillations between the tethered objects. The struts are pivotally moveable into external recesses in the housing sections for stowage and are also moveable to extend radially outward of the inflatable structure in operative condition in which they are attachable to the objects to be tethered. A modified form includes internal hatches and inflatable sealing means which adapt the tether for use as a passageway between space vehicles.

---

The invention described herein was made by employees of the United States Government and may be manufactured and used by or for the Government for governmental purposes without the payment of any royalties thereon or therefor.

This invention relates to a tether, and more particularly to a means for tethering spacecraft in the zero gravity environment of space.

The tethering of orbiting spacecraft has been accomplished and it is foreseen that tethering of objects in space will become a common and useful practice in future space exploration. For example, it is anticipated that tethering of spacecraft will be used to facilitate station-keeping and curtail excessive expenditure of fuel. Tethers will also be used to tether astronauts to a space ship or space station when engaged in extravehicular activities, and tethers will also prove useful for many purposes in such tasks as the erection and assembly of space stations in a zero gravity environment.

A flexible tether of Dacron webbing has heretofore been used in tethering an orbiting spacecraft and an orbiting booster rocket. However, the tether which was used for station-keeping and to establish and maintain a stabilized condition between the two orbiting vehicles posed several disadvantages. To take up slack in the tether which was 100 feet long, and to establish a desired separation distance, the vehicles were separated by thrusting. To keep the tether taut it was also necessary to revolve the linked vehicles in a plane normal to the spacecraft center lines, thereby creating a centrifugal force for separating the vehicles. Considerable fuel was expended to establish the separation distance and to set up a centrifugal force. An alternative method of allowing the force due to gravity gradient to take up slack in the tether was also followed, but either method resulted in producing undesirable relative oscillations between the tethered vehicles when the tether became taut. Further expenditure of fuel was required for thrusting to correct spacecraft attitudes and for reducing the oscillations or alternatively, a lengthy period of oscillating had to be endured while the relative movements were dampening.

The inflatable tether assembly of this invention which has been devised to circumvent the attendant disadvantages of prior art tethers includes an inflatable structure of rigid housing sections and a tubular casing of flexible fabric which is bonded at its respective ends to the housing sections to provide a closed fluid-tight inflatable structure. For stowage purposes, the housing sections are connectable to provide a substantially closed container. The flexible fabric casing is stowed in a folded, readily expandable condition within the joined housing sections and a releasable clamp is provided for tentatively securing the housing sections. The inflatable structure is provided with an inflating means in the form of a container of pressurized gas which is controllable by a valve means to inflate and expand the structure into an elongate semi-rigid column. Attachment means comprising shock absorbing and attenuating struts are provided at each end of the inflatable structure. The struts are pivotally joined to the housing sections, and when stowed are folded into external recesses in the housing sections and secured therein by a quick-release strap.

In operation, the shock absorbing struts are attached to the space vehicles or objects to be tethered and inflation of the structure results in the formation of a semi-rigid column which separates the objects to a desired distance. The dampening inherent in the inflatable structure and the shock absorbing means serves to dampen relative oscillations between the two spacecraft. The semi-rigid nature of the inflatable tether serves to maintain desired distance between the tethered objects without dependence on centrifugal force or gravity gradient, and it allows the maneuvering of two tethered spacecraft as one unit for low velocity inputs. The stable features of the inflatable tether permit its length to be short and thus permit easier travel from one spacecraft to another by an extra-vehicular astronaut when using the tether as a support. The rigidity of the tether also permits its use as a rest station for the astronaut, and in one modified form is of sufficient size to provide an airlock or passageway between space vehicles and includes internal hatches and an inflatable sealing means at the joinder with the space vehicles.

Other objects and many of the attendant advantages of this invention will be readily appreciated as the same become better understood by reference to the following detailed description when considered with the accompanying drawings in which like reference numerals designate like parts throughout the figures thereof and wherein:

FIG. 1 is a view showing the inflatable tether device of this invention in its inflated state when deployed as a tether between two orbiting spacecraft;

FIG. 2 is a longitudinal sectional view of the inflatable tether device of this invention showing the shock absorbing and attenuating struts at one end of the assembly in stowed condition, and shock absorbing and attenuating struts at the other end of the assembly when deployed in operative condition suitable for attachment to an object to be tethered;

FIG. 3 is an end view of the invention when in its stowed condition; and

FIG. 4 is a sectional view of part of a modified form of the inflatable tether of this invention showing it adapted for use as a passageway between two tethered space vehicles.

Referring more particularly to the drawings, there is shown in FIG. 2 an inflatable tether device 10 which represents a preferred embodiment of the invention. The tether device 10, which is shown in a compact uninflated state in which it is suitable for stowage, comprises a pair of rigid aluminum housing sections 13 and 14 which are generally cup-like members of circular configuration at their open ends. The sections are provided with outwardly flaring end flanges 13a and 14a, respectively, to facilitate joining the ends of the sections together and providing a closed container. A band clamp comprising a stainless steel or aluminum V-shaped band 16 is disposed circumferentially about the flanged ends of the sections and in engagement therewith. A conventional toggle clamp means (not shown) is provided for tightening the band and securing the sections together, however, it is to be understood that other clamping devices, securing straps, or the like, might also be satisfactorily used in lieu of the band clamp 16.

A tubular casing 20 of flexible fluid-impervious fabric, such as Neoprene, silicone rubber-coated nylon, or the like, is bonded at its respective open ends to the inner walls of the housing sections 13 and 14 adjacent the flanged ends of the housing sections and provides therewith a closed inflatable structure. Any adhesive which provides a suitable bond and seal between the fabric and the aluminum sections 13 and 14 is employed. As shown in FIG. 2, the flexible casing is stowed in a compact manner within the housing sections by a succession of folds beginning at each end of the casing whereby the casing is readily expandable into its inflated state. Preferably, the tubular casing is of circular cross-section and to simplify its folding and stowage within the housing sections it is so configured that it is of narrowest cross-section at its midpoint and in its inflated state is uniformly tapered from its ends to the middle.

Within the housing section 13 is disposed an inflating means in the form of a spherical metallic pressure vessel 21 which is filled with a compressed gas. The pressure vessel is secured by a number of supports 22, preferably of a lightweight material such as aluminum or Fiberglas, which are bonded to the internal walls of the housing 13. An outlet passage 23 is provided, which is controllable by a shut-off valve 24, and communicates with the interior of the inflatable structure through the action of a pressure regulator 25. The valve stem 26 extends through the wall of the housing and is provided with a suitable handle or knurled knob 27. Desirably, a recess 28 is formed in the external wall of the housing at the location of the valve handle 27 so that it need not protrude beyond the radial extremity of the housing and is protected thereby. A packing gland 29 is provided which seals around the valve stem at its point of exit through the housing.

The pressure regulator 25 comprises a normally open conical-shaped valve 31 which is interposed in the outlet passage 23. The valve element 31 is fastened to a diaphragm 32 and is biased in open condition by the action of a metallic bellows 32 which normally urges the diaphragm and conical-shaped valve element away from its valve seat 34. Desirably, a transverse perforated partition 36 is also provided for the housing section 13 which separates the inflating means from the folds of the flexible casing to prevent possibility of its being fouled or damaged.

It will therefore be apparent that when the shut-off valve 24 is opened, the supply of pressurized gas rapidly fills the inflatable structure and with the band clamp 16 removed, the flexible casing 20 is extended and, with the housing sections at its ends, forms an elongate semi-rigid column. At a suitable pressure in the column, the diaphragm and bellows are moved to the right in FIG. 2, and the valve 31 closes off the outlet passage 23 and the supply of compressed gas.

At each end of the inflatable structure, the tether device 10 is provided with a plurality of dampening struts 40 which are pivotally secured to the housing sections 13 and 14 and are attachable to an object to be tethered. The dampening devices 40 serve to absorb energy of the tethered objects when they are oscillating relative to each other and to attenuate any disturbing forces applied to the tether by the objects. As shown in FIG. 3, there are three such dampening struts at each end of the inflatable structure and they are circumferentially spaced about the rigid housing section to which they are attached by pivots 41. It is understood, of course, that any suitable number of such dampening devices might be provided. For stowage purposes, the dampening struts are each pivotally moveable into a recess 42 provided in the external wall of the housing section and at each housing section the struts are held in stowed condition by a releasable strap 43 which wraps around the housing section.

In a preferred form of dampening device, the strut 40 comprises a pair of telescoping cylinders 44, 45 with a shaft 46 extending coaxially through the cylinder 44 from its closed end adjacent the pivot 41 into the smaller cylinder 45 which is slideably received within the cylinder 44. The shaft 46 is provided with a piston head 47 which abuts one end of a compressed coiled spring 48 located within the chamber formed between the piston 47 and the closed end 49 of the small cylinder 45. Another coiled spring 50 is sleeved around the shaft 46 and is located within the chamber also formed within cylinder 45 between the piston 47 and the cylinder head 51 of the cylinder 45. Vent parts 53, 54 are provided for the cylinders 44 and 45, respectively, adjacent the extremities of the dampening strut. The free end 55 of the dampening strut is also provided with an eye 56 whereby it may be readily secured by a suitable fastening device to an object to be tethered.

It will therefore be apparent that the spring 48 will absorb energy from a push exerted on the strut 40 by the object which is tethered and, in like manner, the spring 50 will absorb any pulling force which may be exerted on the strut by the same tethered object. Desirably, the recesses 42 in the housing, which accommodate the dampening struts for stowage, are of such length that each strut must be telescopically compressed against the action of the spring 48 and the free end of the strut engages an outwardly facing shoulder 42a of the housing. When the securing strap 43 is released, the spring 48 urges the free end of the strut against the shoulder 42a and therefore outwardly away from the housing where they are more easily accessible.

Referring to FIG. 1, an inflatable tether device 10, representing a preferred embodiment of this invention, is shown in its inflated state in an application as a tethering means between two spacecraft 61 and 62. However, to place the tether device 10 in this operative condition, the dampening struts 40 are first released from their stowed condition at the sides of the housing sections by removal of the securing straps 43. An astronaut located outside the spacecraft then attaches the free ends of the dampening struts at appropriate locations on the two spacecraft. The V-band clamp 16 is then released and the control valve 24 opened to release pressurized gas into the inflatable structure which rapidly forms an elongate semi-rigid column and separates the spacecraft to a distance corresponding to at least the length of the inflated structure. The dampening, which is inherent in the inflated structure, and the shock absorbing struts serves to dampen any relative oscillations which may occur between the two spacecraft. In addition, the semi-rigid nature of the inflatable tether serves to maintain the desired distance between the tethered spacecraft without relying on centrifugal force or gravity gradient. Since the inflated tether is relatively stable, its length may be short to thus permit easier travel from one spacecraft to another by an extravehicular astronaut who may wish to use the tether as a support. It is also possible, because of the semi-rigidity of the tether, to maneuver the two spacecraft as one unit for low velocity inputs and thereby effect economy of fuel.

There is also shown, in FIG. 4, a modified form 10' of the inflatable tether device of this invention which, in addition to its tethering function is also adapted to serve as a passageway between tethered spacecraft. In this modification of the invention, which is of sufficient diameter to accommodate an astronaut crawling therethrough, the pressurized gas container 21' is located on the exterior wall of one of the rigid housing sections 14' where it does not obstruct passage through the inflated structure but is communicable with the inflatable structure by means of an opening provided in the wall of the housing section. The end wall of each housing section is also provided with a fluid-tight hatch 66 which may be opened from either the exterior or the interior of the inflated structure. The hatches are readily removable and may be fastened by readily removable bolts or hingedly connected to the housing wall. The inflatable tether device 10' is otherwise substantially identical in structure to the tether 10 except for the provision of an inflatable sealing means 70 at each end which extends circumferentially about the housing section and is bonded thereto by a suitable adhesive and appropriate fastening devices 71. The sealing means 70 is an expansible ring of Neoprene, or the like, the interior of which is in communication with the flexible casing 20' by small openings 72 in the wall of the housing section and is inflatable simultaneously therewith. The tether 10' is secured to the spacecraft to be tethered in a manner similar to the securing of the tether 10. However, the housing section at each end of the device is located within an entry hatch or docking port of the spacecraft to which it is attached whereby inflation of the sealing ring will effect a seal with the wall of the spacecraft. The tether device 10' thereupon serves also as a pressurized passageway between the tethered spacecraft.

It will therefore be seen that an inflatable tether device is described herein which is packagable in a relatively small compact package suitable for stowage. Although particularly adapted as a tether between objects in a zero gravity environment, it can also function effectively as a tether under gravitational conditions particularly where it is desirable to dampen oscillations between the tethered objects or to attenuate disturbing forces therebetween. Various substitutions may be made for the materials described in the structure of the device and various shock absorbing and attenuating devices may also be used in lieu of the piston-type shock absorbing struts described herein. The inflating means might also be other than a spherical container of compressed gas since other shaped containers and sources of pressurant fluid such as chemical gas generators might be employed. Initiation of operation of the inflating means could also be accomplished by remote control and need not be limited to turning of a hand valve. Furthermore, the attachment of the device to a spacecraft or object to be tethered could also be accomplished by remote means.

It should also be understood that the foregoing disclosure relates only to preferred embodiments of the invention and that it is intended to cover all changes and modifications of the examples of the invention herein chosen for the purposes of the disclosure and which do not constitute departure from the spirit and scope of the invention.

What is claimed and desired to be secured by Letters Patent is:

1. An inflatable tether assembly including an inflatable structure adapted to serve as a tether between objects in the zero gravity environment of space, said assembly compromising:
    a pair of cup-like housing sections adapted to be connected in lip-to-lip configuration;
    a tubular casing of flexible fluid-impervious fabric attached at its respective ends to said housing sections to provide therewith a close fluid-tight inflatable structure, said flexible tubular casing in its uninflated state being reducible to small size in which it is receivable in said housing sections;
    means for releasably securing said housing sections in said lip-to-lip configuration with said flexible casing disposed in a folded expendable configuration within said housing sections;
    an inflating means comprising a container of compressed gas;
    valve means controllable externally of said structure for releasing the compressed gas to inflate and expand said structure into an elongate semi-rigid form;
    shock absorbing and attenuating means secured to said housing sections at the ends of said structure and attachable to objects in space whereby said inflatable structure provides a semi-rigid tether between such objects when inflated, said shock absorbing and attenuating means adapted to dampen and attenuate forces exerted between said objects and said inflatable structure.

2. An inflatable tether assembly as described in claim 1 wherein said shock absorber and attenuating means comprise a plurality of piston-type shock absorbers circumferentially spaced about each said housing section and attached thereto, said shock absorbing and attenuating means being attachable to objects in space in an operative condition adapted to attenuate forces exerted between said objects and said inflatable structure.

3. An inflatable structure as described in claim 2 wherein said piston-type shock absorbers are pivotally attached to the housing sections and are movable between a first inoperative position wherein said shock absorbers are disposed to lie adjacent the exterior wall of said housing sections and a second position wherein the shock absorbers at each housing section extend substantially radially from the longitudinal axis of said structure and are operative to dampen and attenuate disturbing forces when attached to objects tethered by said structure in its inflated state.

4. A tether assembly as described in claim 1 wherein the tubular casing of said inflatable structure in its inflated state is of narrowest cross-section at its center and is uniformly tapered from its ends to the middle.

5. An inflatable tether device including an inflatable structure adapted to serve as a tethering means, said device comprising:
    a tubular casing of flexible fluid-impervious fabric attached at its respective ends to rigid end members to provide therewith a closed fluid-tight inflatable structure, said flexible tubular casing in its uninflated state being reducible to a small compact package;
    an inflating means carried by one of said rigid end members, said inflating means comprising a container of compressed gas;
    valve means operatively associated with said container for releasing the compressed gas to inflate and expand said structure into an elongate semi-rigid form; and
    shock absorbing and attenuating means secured to said rigid members at the ends of the structure and attachable to objects to be tethered, whereby said inflatable structure provides a semi-rigid tether between such objects when inflated and cooperatively with said shock absorbing and attenuating means is adapted to attenuate forces exerted between said objects and the inflated structure and to dampen relative oscillations between said objects.

6. An inflatable tether device as described in claim 5 wherein said shock absorbing and attenuating means comprise a plurality of piston-type shock absorbers circumferentially spaced about each said rigid end section and attached thereto, said shock absorbing and attenuating means being attachable in an operative condition to objects to be tethered, whereby said shock absorbers are adapted to dampen and attenuate forces exerted between the tethered objects and said inflatable structure when in the inflated state.

7. An inflated tether device as described in claim 6 wherein said piston-type shock absorbers are pivotally attached to said rigid end sections and are moveable between a first inoperative position wherein the shock absorbers are disposed to lie longitudinally adjacent said tether assembly and a second position wherein the shock absorbers extend radially from said inflatable structure and are attachable to objects to be tethered.

8. An inflatable tether device as described in claim 5 further including hatch means provided in each of the rigid end members, and a pair of sealing means extending circumferentially about the respective ends of said inflatable structure whereby said tether device is connectable at either end to the entry hatch of a space vehicle to provide a passageway thereto.

9. A tether device including an inflatable structure adapted to serve as a tethering means between objects in a zero gravity environment, said device comprising:
 a tubular casing of flexible fluid-impervious fabric, said flexible tubular casing being adapted to being inflated into an elongate semi-rigid form; and
 connecting means on the ends of the inflatable structure and attachable to objects to be tethered whereby said inflatable structure provides a semi-rigid tether adapted to establish and maintain substantially constant separation distance between said objects when in its inflated state and to dampen relative oscillatory movements between the tethered objects, said tubular casing of said inflatable structure in its inflated state being of narrowest cross-section at its center and uniformly tapered from its ends to the middle.

References Cited

UNITED STATES PATENTS 3,169,725 2/1965 Berglund.
3,262,655 7/1966 Gillespie.

OTHER REFERENCES

IAS publication of the 1960 Manned Space Station Symposium: "Inflatable Manned Orbital Vehicles," by Carter and Bogen of Martin, Baltimore, pages 188–196.

MILTON BUCHLER, *Primary Examiner.*

FERGUS S. MIDDLETON, *Examiner.*

B. BELKIN, *Assistant Examiner.*